United States Patent
Bradbury et al.

(10) Patent No.: US 10,883,228 B2
(45) Date of Patent: Jan. 5, 2021

(54) PROCESS FOR REDUCING LINT FROM TISSUE AND TOWEL PRODUCTS

(71) Applicant: STRUCTURED I, LLC, Great Neck, NY (US)

(72) Inventors: James E. Bradbury, Anderson, SC (US); Dustin Ziegelman, Anderson, SC (US); James E. Sealey, II, Belton, SC (US); Byrd Tyler Miller, IV, Easley, SC (US)

(73) Assignee: STRUCTURED I, LLC, Great Neck, NY (US)

( * ) Notice: Subject to any disclaimer, the term of this patent is extended or adjusted under 35 U.S.C. 154(b) by 50 days.

(21) Appl. No.: 15/960,989

(22) Filed: Apr. 24, 2018

(65) Prior Publication Data
US 2018/0313038 A1    Nov. 1, 2018

Related U.S. Application Data

(60) Provisional application No. 62/488,982, filed on Apr. 24, 2017.

(51) Int. Cl.
| | |
|---|---|
| *D21H 27/38* | (2006.01) |
| *D21H 27/30* | (2006.01) |
| *D21H 27/00* | (2006.01) |
| *D21H 11/20* | (2006.01) |
| *D21H 17/29* | (2006.01) |

(Continued)

(52) U.S. Cl.
CPC ............ *D21H 27/38* (2013.01); *B32B 29/00* (2013.01); *D21H 11/18* (2013.01); *D21H 11/20* (2013.01); *D21H 17/29* (2013.01); *D21H 21/18* (2013.01); *D21H 21/22* (2013.01); *D21H 23/04* (2013.01); *D21H 27/002* (2013.01); *D21H 27/30* (2013.01)

(58) Field of Classification Search
None
See application file for complete search history.

(56) References Cited

U.S. PATENT DOCUMENTS

| | | |
|---|---|---|
| 6,267,845 B1 | 7/2001 | Hautala et al. |
| 6,303,000 B1 | 10/2001 | Floyd et al. |
| | (Continued) | |

FOREIGN PATENT DOCUMENTS

| | | |
|---|---|---|
| WO | 96/23104 A1 | 8/1996 |
| WO | 01/38637 A1 | 5/2001 |

OTHER PUBLICATIONS

Smook, Gary A., Handbook for Pulp and Paper Technologists, 2nd ed, Angus Wilde Publications, 1992, p. 207 (Year: 1992).*

(Continued)

*Primary Examiner* — Dennis R Cordray
(74) *Attorney, Agent, or Firm* — Amster, Rothstein & Ebenstein LLP (57) ABSTRACT

A method of making a tissue or paper towel product including forming two or more multi-layered webs of cellulosic fibers by a papermaking process using a structured fabric, the papermaking process comprising a step of adding a cross-linker to a pulp slurry comprising the cellulosic fibers so that at least some of the cellulosic fibers are cross-linked within the pulp slurry, and laminating the two or more multi-layered webs together so as to form a multi-ply product, each ply of the multi-ply product comprising cross-linked fibers as a percentage of the total fiber mix of the ply.

28 Claims, 3 Drawing Sheets

(51) Int. Cl.
*D21H 21/18* (2006.01)
*D21H 23/04* (2006.01)
*D21H 21/22* (2006.01)
*B32B 29/00* (2006.01)
*D21H 11/18* (2006.01)

(56) References Cited

U.S. PATENT DOCUMENTS

| | | |
|---|---|---|
| 9,133,583 B2 | 9/2015 | Ballinger |
| 2003/0201083 A1* | 10/2003 | Marsh ................. B32B 29/00 162/146 |
| 2005/0016699 A1* | 1/2005 | Stoyanov ............ D06M 13/123 162/9 |
| 2009/0104430 A1 | 4/2009 | Cordial et al. |
| 2010/0024998 A1 | 2/2010 | Wildlock et al. |
| 2010/0170647 A1 | 7/2010 | Edwards et al. |

OTHER PUBLICATIONS

PCT Search Report and Written Opinion dated Jul. 11, 2018 in connection with PCT/US2018/29053.
Song D, "Starch Crosslinking for Cellulose Fiber Modification and Starch Nanoparticle Formation," Dissertation to School of Chemical and Biomolecular Engineering Georgia Institute of Technology, May 2011, 33 pages.

* cited by examiner

PROCESS FOR REDUCING LINT FROM TISSUE AND TOWEL PRODUCTS

RELATED APPLICATIONS

This application is a non-provisional that claims priority to and the benefit of U.S. Provisional Patent Application No. 62/488,982, filed Apr. 24, 2017 and entitled PROCESS FOR REDUCING LINT FROM TISSUE AND TOWEL PRODUCTS, the contents of which are incorporated herein by reference in their entirety.

FIELD OF THE INVENTION

The present invention relates to a process to manufacture disposable two-ply facial, sanitary tissue or paper towel with decreased levels of lint.

BACKGROUND

Across the globe there is great demand for disposable paper products. In the North American market, the demand is increasing for higher quality products offered at a reasonable price point. Two important attributes for consumers of disposable sanitary tissue, facial tissue, and paper towels are softness and strength.

Softness is the pleasing tactile sensation the consumer perceives when using the tissue product as it is moved across his or her skin or crumpled in his or her hand. To increase the softness of facial tissue and sanitary tissue, chemical debonding agents, lotions, or softeners are normally used, as disclosed in, for example, U.S. Pat. Nos. 5,246,545, 5,264,082, 5,334,286, 5,354,425, 5,385,642, 5,437,766, 5,494,731, 5,527,560, 5,981,044, 4,351,699, 4,441,962, 4,940,513, 5,240,562, 5,246,545, 5,405,501, 5,510,000, 5,698,076, 5,814,188, 5,846,380, 6,162,329, 6,179,961, 6,579,416, 6,607,637, 6,797,117, 7,432,309, 5,575,891, 5,624,532, 6,179,961, 5,525,345, 5,624,676, 5,705,164, 5,716,692, 5,830,487, 6,238,682, 6,261,580, and 7,771,566.

The use of such debonding agents is broadly taught in the art. Such disruption of fiber-to-fiber bonds provides a twofold purpose in increasing the softness of the tissue sheet. First, the reduction in hydrogen bonding produces a reduction in tensile strength thereby reducing the stiffness of the sheet. Secondly, the debonded fibers provide a surface nap to the tissue sheet enhancing the "fuzziness" of the tissue sheet. This tissue sheet fuzziness may also be created through use of creping, where sufficient interfiber bonds are broken at the outer surface of the tissue sheet to provide a plethora of free fiber ends on the surface of the tissue sheet. However, both debonding and creping increase levels of lint in the tissue product. Indeed, while softness increases, it is at the expense of an increase in lint in the tissue sheet relative to an untreated control. Lint can generally be defined as the tendency of the fibers in the tissue sheet to be rubbed loose from the tissue sheet when handled.

It is also known in the art to use a multi-layered tissue structure to enhance the softness of the tissue sheet. In such a tissue structure, a thin layer of strong softwood fibers is used in the center layer to provide the necessary tensile strength for the tissue product. The outer layers of such a tissue structure are composed of the shorter hardwood fibers, which may or may not contain a chemical debonder. A disadvantage to using such layered structures is that while softness of the tissue sheet is increased, the mechanism for such increase is believed to result from an increase in the surface nap of the debonded, shorter fibers. As a consequence, such tissue structures, while showing enhanced softness, do so with a trade-off of an increase in the level of lint. Lint is undesirable and can be left behind on the surface of a window, mirror, or tabletop in the case of paper towels, the perineal area in the case of sanitary tissue, or the nasal area in the case of facial tissue. Accordingly, minimization of lint production is an important concern for consumers of facial, sanitary tissue and paper towel products.

There are several methods known in the art to minimize lint. One method is to add a chemical strength agent, additive, or binder into the fiber slurry before forming the tissue web. Alternatively, some additives have been delivered to the web in a contacting step, such as by printing the additives onto the fibrous structures via cylinders or rolls, such as rotogravure rolls, and/or by brushing the additives onto the fibrous structures and/or by transferring the additives from wires and or belts/fabrics during the papermaking process. Another method to deliver the strength agent, additive, or binder to the web is to mix it with the creping adhesive which is applied to the Yankee dryer such that it gets removed by the creping blade and deposited onto the surface of the web. In a layered sheet, which may be formed using a layered headbox, the selection of the layer and amount of additive can be utilized to maximize lint reduction while minimizing the reduction in softness. The chemical strength agents, additives, and binders can be selected from permanent wet strength binders such as polyamide-polyamine-epichlorohydrin, polyacrylamides, styrenebutadiene latexes; insolubilized polyvinyl alcohol; urea-formaldehyde; polyethyleneimine; chitosan polymers and mixtures thereof. They may also be temporary wet strength binders such as modified starch which can be made by reacting dimethoxyethyl-N-methyl-chloroacetamide with cationic starch polymers or glyoxalated polyacrylamides or mixtures thereof. Dry strength additives may also be used such as starch (modified or unmodified), polyvinyl alcohol, guar or locust bean gums; and/or carboxymethyl cellulose, anionic or cationic polyacrylamides, ethylene vinyl acetate, alphopefin polyerms with an ethylene-carboxylic acid copolymer, or size agents such as alkenylsuccinic anhydride or alkyl keton dimmers or rosin dispersion sizing. Methods of controlling lint that involve the use of chemical strength agents, additives, or binders are disclosed in, for example, U.S. Pat. Nos. 8,398,821, 7,976,679, 7,879,190, 7,794,565, 6,488,812, 6,432,270, 6,951,598, 6,893,537, 6,752,905, 6,149,769, 5,853,539, 5,558,873, 5,573,637, 5,538,595, 5,437,766, 5,227,242, 5,059,282, 4,950,545, and 4,940,513. The downside of these methods is that application of these additives can decrease softness of the product which can limit the amount of additive that can be utilized or limit the layer of a multi-layered product in which the additive can be utilized.

A second effective method known in the art to minimize lint is the incorporation of synthetic fibers such as, for example, wet spun fibers, dry spun fibers, melt spun (including melt blown) fibers, synthetic pulp fibers and mixtures thereof. Synthetic fibers may, for example, be comprised of cellulose (often referred to as "rayon"); cellulose derivatives such as esters, ether, or nitrous derivatives; polyolefins (including polyethylene and polypropylene); polyesters (including polyethylene terephthalate); polyamides (often referred to as "nylon"); acrylics; non-cellulosic polymeric carbohydrates (such as starch, chitin and chitin derivatives such as chitosan); and mixtures thereof. Synthetic fibers may help reduce lint in a variety of ways. For instance, the synthetic fibers can soften and fuse to themselves and the pulp fibers upon heating (e.g., thermofusing), thereby creating a continuous or semi-continuous network within the layer of the web. This network can help prevent zones of cellulosic fibers from being removed from the web layer as lint. In addition, due to their relatively long nature, the synthetic fibers tend to entangle with the pulp fibers, thereby further inhibiting the removal of the pulp fibers as lint. For instance, synthetic fibers typically have a length of from about 0.5 to about 30 millimeters. Methods for controlling lint that involve the use of synthetic fibers are disclosed in, for example, U.S. Pat. Nos. 7,972,986, 6,861,380, 9,458,573, 7,670,678, 7,615,278, 7,101,460, 6,949,168, 6,887,530, 6,861,380, 6,841,038, 6,488,812, 6,096,152, and 6,017,418. However, synthetic fibers are associated with high cost, much higher than wood fibers which are typically utilized in tissue and toweling products, and the long fiber length can cause fiber plugs in the stock approach system of the paper machine as fiber bundles form around the long fiber. These fiber plugs can also release bundles of fiber into the nascent web causing holes in the web and subsequent sheet breaks and related downtime on the paper machine. Further, the synthetic fibers may have a "density imbalance" with the wood fibers. If the density imbalance is too high (e.g., positive), the fibers tend to float in water during the papermaking process so that a counter-acting fiber surface treatment is required to "sink" the fibers to a desired extent into the cellulosic fibrous furnish for uniform mixing therewith. If the density imbalance is too low, the fibers tend to sink in water during the papermaking process so that a counter-acting fiber surface treatment is required to "raise" the fibers to a desired extent for uniform mixing with the cellulosic fibrous furnish.

A third effective method known in the art to limit lint is simple fiber or additive stratification in a multilayered product whereby careful distribution of fibers and additives such as debonder and strength additives are selected and added in specific ratios to each layer to maximize softness and minimize lint. There is however always a tradeoff between softness and lint and an improved ratio of softness to lint is always desired. Such methods are disclosed in, for example, U.S. Pat. Nos. 8,968,517, 7,377,995, 6,673,203, 6,709,550, and 6,464,830.

A fourth effective method known in the art to minimize lint is use of the Coanda Effect which uses the smooth flow of a thin layer of air to scrub off dust and lint embedded and entangled in the web surface. These methods are disclosed in, for example, U.S. Pat. Nos. 6,193,810, 4,247,993, 4,932,140, 3,587,177, 5,433,298, and 5,577,294. A downside of this method is the air flow can destabilize the traveling paper web, thereby causing sheet breaks. The removed lint must also be removed from the process by dust collection equipment or the lint buildup will cause process safety issues, namely fire hazards.

Lastly, enzymes may be used to help limit lint. The enzymes can be used to enhance bonding between fibers as described in U.S. Pat. Nos. 8,043,828 and 6,808,595, thus limiting fiber liberation from the web and thus producing less linting. Enzymes can also be expensive and difficult to control as they can denature and become inactive due to time, temperature, pH or other varying process conditions.

SUMMARY OF THE INVENTION

An object of the present invention is to provide a process to produce soft and strong disposable sanitary, facial tissue and/or paper towel with decreased levels of lint by utilization of cross-linked fibers as a percentage of the overall furnish mix.

In at least one exemplary embodiment, the cross linked cellulosic based fibers are prepared using a pulp slurry comprised essentially of water, a cellulosic pulp, a cross-linker, and a binder.

In at least one exemplary embodiment, the consistency of the pulp is preferably between 2% to 6% and more preferably between 3% to 5%.

In at least one exemplary embodiment, the cross linker is a glyoxal-containing cross-linker.

In at least one exemplary embodiment, the binder is a cationic starch containing between 0.2% to 0.6% nitrogen.

In at least one exemplary embodiment, the pulp slurry comprising water, a cellulosic pulp, a cross-linker, and a binder are mixed in a vessel with agitation from 5 to 45 minutes between 150 to 200 degrees Fahrenheit to produce cross-linked fibers, more preferably 5 to 30 minutes between 165 and 180 degrees Fahrenheit.

In at least one exemplary embodiment, the cross-linked fibers are blended in different ratios into the stock chests that supply different layers of a multilayered stock preparation system comprising a multilayered headbox.

In at least one exemplary embodiment, the cross-linked fibers are blended only into the stock chests which feed the layer which ultimately will face outward when webs of the tissue or towel product are laminated together.

In at least one exemplary embodiment, the cross-linked fibers are blended only into the stock chests which feed the layer which ultimately will face outward when webs of the tissue or towel product are laminated together, where the cross-linked fiber is less than 50% of the total weight percentage of that layer.

In at least one exemplary embodiment, the stock preparation system supplies a wet-laid paper process that utilizes a structuring fabric such as: Through Air Drying (TAD), Uncreped Through Air Drying (UCTAD), Advanced Tissue Molding System (ATMOS), NTT, or ETAD.

In at least one exemplary embodiment, the web produced from the wet laid paper process is laminated to form a 2-ply sanitary, facial tissue or towel product.

A method of making a tissue or paper towel product according to an exemplary embodiment of the present invention comprises: forming two or more multi-layered webs of cellulosic fibers by a papermaking process using a structured fabric, the papermaking process comprising a step of adding a cross-linker to a pulp slurry comprising the cellulosic fibers so that at least some of the cellulosic fibers are cross-linked within the pulp slurry; and laminating the two or more multi-layered webs together so as to form a multi-ply product, each ply of the multi-ply product comprising cross-linked fibers as a percentage of the total fiber mix of the ply.

In at least one exemplary embodiment, the pulp slurry further comprises water and a binder In at least one exemplary embodiment, consistency of the pulp slurry is between 2% to 6%.

In at least one exemplary embodiment, consistency of the pulp slurry is between 3% to 5%.

In at least one exemplary embodiment, the cross-linker is a glyoxal-containing cross-linker.

In at least one exemplary embodiment, the binder is a cationic starch containing 0.2% to 0.6% nitrogen by weight.

In at least one exemplary embodiment, the pulp slurry is mixed in a vessel with agitation from 5 to 45 minutes between 150 to 200 degrees Fahrenheit to produce the cross-linked fibers.

In at least one exemplary embodiment, the pulp slurry is mixed in a vessel with agitation from 5 to 30 minutes between 165 and 180 degrees Fahrenheit to produce the cross-linked fibers.

In at least one exemplary embodiment, the cross-linked fibers are blended in different ratios into stock chests that supply different layers of a multi-layered stock preparation system comprising a multi-layered headbox.

In at least one exemplary embodiment, the cross-linked fibers are blended only into stock chests which feed a layer configured to face outward when the webs of the tissue or towel product are laminated together.

In at least one exemplary embodiment, the cross-linked fibers are blended only into stock chests which feed a layer configured to face outward when the webs of the tissue or towel product are laminated together, and the cross-linked fibers make up less than 50% of the total weight percentage of that layer.

In at least one exemplary embodiment, the tissue or paper towel product is made using a process selected from the group consisting of: Through Air Drying (TAD), Uncreped Through Air Drying (UCTAD), Advanced Tissue Molding System (ATMOS), New Tissue Technology (NTT) and Energy Efficient Technologically Advanced Drying (ETAD).

In at least one exemplary embodiment, the cross-linked fibers are cross-linked with micro-fibrillated cellulose.

In at least one exemplary embodiment, the method further comprises the step of adding the micro-fibrillated cellulose to the pulp slurry.

In at least one exemplary embodiment, consistency of the pulp is between 2% to 6%.

In at least one exemplary embodiment, consistency of the pulp is between 3% to 5%.

In at least one exemplary embodiment, the micro-fibrillated cellulose is added at an inclusion rate of 0.5 to 2 wt % based on oven dry weight of the pulp fiber.

In at least one exemplary embodiment, the micro-fibrillated cellulose is added at a consistency of 0% to 3%.

In at least one exemplary embodiment, the micro-fibrillated cellulose is added at a consistency of 1%.

In at least one exemplary embodiment, cross linker is a glyoxal-containing cross-linker added in an amount of 0.05 wt % to 0.25 wt % based on the oven dry weight of the pulp fiber.

In at least one exemplary embodiment, the binder is a cationic starch containing 0.2 wt % to 0.6 wt % nitrogen, added between 25 to 200 dry lbs per metric ton of oven dry weight of the pulp fiber.

In at least one exemplary embodiment, the pulp slurry is mixed in a vessel with agitation from 5 to 45 minutes between 150 to 200 degrees Fahrenheit to produce fibers cross-linked with microfibrillated cellulose.

In at least one exemplary embodiment, the pulp slurry is mixed in a vessel with agitation from 5 to 30 minutes between 165 and 180 degrees Fahrenheit to produce fibers cross-linked with microfibrillated cellulose.

In at least one exemplary embodiment, the fibers cross-linked with micro-fibrillated cellulose are blended in different ratios into stock chests that supply different layers of a multilayered stock preparation system.

In at least one exemplary embodiment, the fibers cross-linked with micro-fibrillated cellulose are blended only into stock chests which feed a configured to face outward when the webs of the tissue or towel product are laminated together.

In at least one exemplary embodiment, the fibers cross-linked with micro-fibrillated cellulose are blended only into stock chests which feed a layer configured to face outward when the webs of the tissue or towel product are laminated together and the cross-linked fiber is less than 50 wt % of the total weight percentage of that layer.

In at least one exemplary embodiment, the method further comprises the step of mixing the micro-fibrillated cellulose with a chemical strength agent.

In at least one exemplary embodiment, the chemical strength agent and micro-fibrillated cellulose are mixed and diluted to a total solids content between 0.5% to 3.0% with continuous agitation.

In at least one exemplary embodiment, the chemical strength agent mixed with micro-fibrillated cellulose is added such that the mixture is between 0.5 wt % to 10 wt % total of the bone dry web.

In at least one exemplary embodiment, the chemical strength agent mixed with micro-fibrillated cellulose is added to a stock system such that all layers of a multi-layer headbox are infused with the mixture.

In at least one exemplary embodiment, the chemical strength agent mixed with micro-fibrillated cellulose is added only into stock chests which feed the layer of a multilayered headbox configured to face outward when the webs of the tissue or towel product are laminated together.

In at least one exemplary embodiment, the chemical strength agent mixed with micro-fibrillated cellulose is added directly to the web at any stage in a paper making process.

In at least one exemplary embodiment, the chemical strength agent mixed with micro-fibrillated cellulose is added directly a fabric, belt, or wire which contacts the web and transfers the mixture to the web.

In at least one exemplary embodiment, the chemical strength agent mixed with micro-fibrillated cellulose is delivered to the web in a contacting step.

In at least one exemplary embodiment, the contacting step comprises at least one of: printing the additives onto the web via cylinders or rolls; and brushing the additives onto the web in a converting process.

BRIEF DESCRIPTION OF THE DRAWINGS

Various exemplary embodiments of this invention will be described in detail, with reference to the following figures, wherein.

DETAILED DESCRIPTION

A process to produce soft and strong disposable structured sanitary, facial tissue or paper towel products with low lint according to an exemplary embodiment of the present invention includes use of cross-linked fibers as a percentage of the total fiber mix in one or more layers of a multilayered product that is laminated to produce a multiply product. Preferably, the outward facing layer of each ply of the product contains cross-linked fiber.

The use of cross-linkers has been explored for some types of paper other than tissue and towel products, such lightweight coated, newsprint, board or copy paper to increase paper strength or stiffness, such as in, for example, U.S. Pat. No. 5,281,307, GB Patent No. 1,471,226, U.S. Pat. Nos. 6,379,499 and 9,133,583. However, an area that has not been explored in tissue and towel products is using cross-linkers to bond fibers together to reduce lint.

According to an exemplary embodiment of the present invention, a tissue or towel product is made by a process that involves a wet laid paper machine that utilizes a structuring fabric, such as, for example, Through Air Drying (TAD), Uncreped Through Air Drying (UCTAD), Advanced Tissue Molding System (ATMOS), New Tissue Technology (NTT), or Energy Efficient Technologically Advanced Drying (ETAD) processes. Examples of patents which describe Through Air Dried processes include U.S. Pat. Nos. 3,301,746, 3,994,771, 3,905,863, 4,191,609, 4,529,480, and 5,245,025. A variation of the TAD process where the sheet is not creped, but rather dried to up to 99% using thermal drying and blown off the structured fabric (using air) to be optionally calendered and reeled also exits. This process is called UCTAD or Un-Creped Through Air Drying process. U.S. Pat. Nos. 5,593,545, 5,667,636, and 5,591,309 describe the UCTAD process. The ATMOS process/method has several patented variations, but all involve the use of a structured fabric in conjunction with a belt press. Examples of patents that describe the ATMOS process include U.S. Pat. Nos. 7,744,726, 7,387,706, 6,821,391, 7,351,307, 7,951,269, 8,118,979, 8,440,055, 8,196,314, 8,402,673, 8,435,384, 8,544,184, 8,382,956, 8,580,083, 7,510,631, 7,686,923, 7,931,781, 7,476,293, 8,075,739 and 8,092,652. Other manufacturing techniques which employ the use of a structured fabric along with an energy efficient dewatering process are the ETAD process and NTT process. The ETAD process and products are described in U.S. Pat. Nos. 7,339,378, 7,442,278 and 7,494,563. The NTT process and products are described in international patent application publication WO 2009/061079 A1.

In all of the wet laid processes mentioned, stock preparation is necessary. The purpose is to prepare the proper recipe of fibers, chemical polymers, and additives that are necessary for the grade of tissue being produced, and diluting this slurry to allow for proper web formation when deposited out of the machine headbox (single, double, or triple layered) to the forming surface. According to an exemplary embodiment of the present invention, cross-linked fibers are used in the stock preparation process.

The cross-linked fibers are prepared using a pulp slurry that includes water, a cellulosic pulp, a cross-linker, and a binder. The consistency of the pulp is preferably between 2% to 6% and more preferably between 3% to 5%. The pulp can be kraft pulp, sulfite pulp, mechanical pulp, eucalyptus pulp, organosolv, or a myriad of recycled pulps where the fibers can be selected in any ratio from cellulosic-based fibers, such as wood pulps (softwood gymnosperms or hardwood angiosperms), cannabis, cotton, regenerated or spun cellulose, jute, flax, ramie, bagasse, kenaf, or other plant-based cellulosic fiber sources.

The cross-linker in the pulp slurry may be, for example, a glyoxal-containing cross-linker, a gluteraldehyde, a polyfunctional aziridine, a zirconium-containing cross-linker, a titanium-containing cross-linker, and an epichlorohydrin, and mixtures thereof. A preferred cross-linker is Curesan 400, a glyoxyl based product sold by BASF, 100 Park Ave, Florham Park, N.J. 07932. The cross-linker is preferably added in an amount between 0.05% to 0.25% based on the oven dry weight of fiber.

The binder in the pulp slurry may be, for example, a starch, casein, protein binder, carboxymethyl cellulose (CMC), polyvinyl alcohol (PVOH), Gum product, and gelatin, and mixtures thereof. A preferred binder is Redibond 2038 available from Ingredion, 5 Westbrook Corporate Center #500, Westchester, Ill. 60154, or any cationic starch containing between 0.2% to 0.6% nitrogen. The binder is preferably added in an amount between 25 to 200 dry lbs per metric ton of bone dry fiber, more preferably 50 to 100 dry lbs per metric ton of bone dry fiber.

The pulp slurry is mixed in a vessel with agitation from 5 to 45 minutes between 150 to 200 degrees Fahrenheit to produce cross-linked fibers, more preferably 5 to 30 minutes between 165 and 180 degrees Fahrenheit. The temperature can be obtained and maintained by using controlled steam injection.

The cross-linked pulp is then blended in different ratios into the stock chests for the different layers of a multilayered stock preparation system which contains a multilayered headbox. Preferably the cross-linked fiber is only added to the outward facing layers of a laminated product. For Example, on a TAD paper machine with a layered stock preparation system, the layer that is in contact with the Yankee dryer is supplied with fiber of which a portion is cross-linked fiber. This minimizes cost while limiting lint formation from the sides of the tissue or towel product that come into contact with the user or object, such sides being the outward facing layers of a laminated product.

The stock preparation system then feeds a wet laid paper machine that utilizes a structuring fabric such as: Through Air Drying (TAD), Uncreped Through Air Drying (UCTAD), Advanced Tissue Molding System (ATMOS), NTT, or ETAD.

The web produced on the wet laid asset is then laminated to produce a two-ply product in a converting operation where the layer of the web containing the cross-linked fiber preferably faces outward.

In another exemplary embodiment of the present invention, the fibers are cross-linked with microfibrillated cellulose by using a pulp slurry that includes water, a cellulosic pulp, a microfibrillated cellulose, a cross-linker, and a binder. The microfibrillated cellulose (also commonly referred to as nanocellulose, nanofibrillated cellulose, nanofibers, or microfibers) may be manufactured from any cellulose containing fibers, which may be found in chemical pulp, mechanical pulp, thermomechanical pulp, and chemi(thermo)mechanical pulp (CMP or CTMP). The pulp used may include pulp from hardwood, softwood or a combination of both types of wood. The chemical pulps that may be used include all types of chemical wood-based pulps, such as bleached, half-bleached and unbleached sulphite, kraft and soda pulps, and mixtures or combinations of these. Non-wood cellulose may also be used as a source for the microfibrillated cellulose. The microfibrillated cellulose is added at an inclusion rate of 0.5 to 2% based on oven dry weight of the pulp fiber, and at a consistency of 0-3%, more preferably 1%.

The cross-linker may be, for example, a glyoxal-containing cross-linker, a gluteraldehyde, a polyfunctional aziridine, a zirconium-containing cross-linker, a titanium-containing cross-linker, and an epichlorohydrin, and mixtures thereof. A preferred cross-linker is Curesan 400, a glyoxyl based product sold by BASF, 100 Park Ave, Florham Park, N.J. 07932.

The binder may be, for example, a starch, casein, protein binder, carboxymethyl cellulose (CMC), polyvinyl alcohol (PVOH), Gum product, and gelatin, and mixtures thereof. A preferred binder is Redibond 2038 available from Ingredion, 5 Westbrook Corporate Center #500, Westchester, Ill. 60154, or any cationic starch containing between 0.2% to 0.6% nitrogen. The binder is preferably added in an amount between 25 to 200 dry lbs per metric ton of bone dry fiber, more preferably 50 to 100 dry lbs per metric ton of bone dry fiber. The cross-linker is preferably added in an amount between 0.05% to 0.25% based on the oven dry weight of fiber. This mixture of pulp, cross-linker, microfibrillated cellulose and binder is preferably mixed in a pulper with agitation at 165 degrees Fahrenheit for 30 minutes, or 180 degrees Fahrenheit for 5 minutes. The temperature can be obtained by using steam injection.

The fibers cross-linked with microfibrillated cellulose are blended in different ratios into the stock chests for the different layers of a multilayered stock preparation system. Preferably the cross-linked fiber is only added to the outward facing layers of a laminated product. For example, on a TAD paper machine with a layered stock preparation system, the layer that is in contact with the Yankee dryer would be supplied with fiber of which a portion is cross-linked fiber. This minimizes cost while limiting lint formation from the sides of the tissue or towel product that come into contact with the user or object, such sides being the outward facing layers of a laminated product.

The stock preparation system then feeds a wet laid paper machine that utilizes a structuring fabric such as: Through Air Drying (TAD), Uncreped Through Air Drying (UC-TAD), Advanced Tissue Molding System (ATMOS), NTT, or ETAD.

The web produced on the wet laid asset is then laminated to produce a two-ply product in a converting operation where the layer of the web containing the cross-linked fiber preferably faces outward.

A process to produce soft and strong disposable structured sanitary, facial tissue or paper towel products with low lint according to another exemplary embodiment of the present invention includes use of microfibrillated cellulose mixed with a strength agent, where the mixture is added to the web in a variety of methods whereby the mixture bonds to the cellulosic fibers of the web and limits liberation of the fibers (lint) during use of the product. Without being bound by theory it is believed that the high surface area of the microfibrillated cellulose provides very high relative bonded area using hydrogen bonding with the fibers of the web to increase the amount of force needed to release fibers from the surface of the web. The chemical strength agent is believed to be a vehicle to retain higher amounts of the microfibrillated cellulose to the web. The chemical strength agent is a much larger molecule than the microfibrillated cellulose which it bonds with as it is mixed and applied to the paper web or stock slurry. These large sized chemical strength agents bonded with the microfibrillated cellulose allow for higher retention when added to the stock slurry and prevent the mixture from blowing through open areas of the web if applied using a spray shower. The chemical strength agent itself will also bond with the fibers of the paper web to further decrease lint.

The mixture of chemical strength agents and microfibrillated cellulose are added to the pulp slurry, or directly to the web at any stage in the paper making process, such as forming, drying, or reeling. The mixture can also be sprayed onto wires and or belt/fabrics used during the paper making process to transfer the mixture to the sheet. Alternatively, the mixture can be delivered to the web in a contacting step, such as by printing the additives onto the fibrous structures (web or sheet) via cylinders or rolls, such as rotogravure rolls, and/or by brushing the additives onto the fibrous structures in the converting process. The chemical strength agents, additives, and binders can be selected from permanent wet strength binders such as polyamide-polyamine-epichlorohydrin, polyacrylamides, styrenebutadiene latexes; insolubilized polyvinyl alcohol; urea-formaldehyde; polyethyleneimine; chitosan polymers and mixtures thereof. They may also be temporary wet strength binders such as modified starch which can be made by reacting dimethoxy-ethyl-N-methyl-chloroacetamide with cationic starch polymers or glyoxalated polyacrylamides or mixtures thereof. Dry strength additives may also be used, such as starch (modified or unmodified), polyvinyl alcohol, guar or locust bean gums; and/or carboxymethyl cellulose, anionic or cationic polyacrylamides, ethylene vinyl acetate, alph-opefin polyerms with an ethylene-carboxylic acid copolymer, or size agents such as alkenylsuccinic anhydride or alkyl keton dimmers or rosin dispersion sizing.

According to an exemplary embodiment, the chemical strength agent mixed with microfibrillated cellulose is added to the stock system. The chemical strength agent and microfibrillated cellulose can be mixed together (co-mixed) with thorough agitation at a solids content between 0.5% to 3.0%. Another method is to feed the microfibrillated cellulose at 0.5% to 3.0% solids into the discharge piping (mixed inline) from the chemical strength agent tank to the stock tanks. This allows the solids to be much higher in the chemical agent tank if a higher percent of chemical strength agent is desired over the microfibrillated cellulose. The mixture can be added to all the layers of a multilayer stock system that feeds a multilayer headbox, or into the stock chests which feed the layer of a multilayered headbox which ultimately will face outward when webs of the tissue or towel product are laminated together.

Alternately, the chemical strength agent co-mixed or mixed inline with microfibrillated cellulose can be added directly to the web at any stage in the paper making process, such as the forming, drying, or reeling stages. A shower with double coverage nozzles fed by a chemical feed system from both sides of the spray shower is preferred. This keeps the pressure constant across the spray shower and eliminates the need for recirculation. The spray shower may also be placed across a fabric, belt, or wire that will contact the paper web and transfer the mixture to the web.

The paper web may be comprised of kraft pulp, sulfite pulp, mechanical pulp, eucalyptus pulp or a myriad of recycled pulps where the fibers can be selected in any ratio from cellulosic-based fibers, such as wood pulps (softwood gymnosperms or hardwood angiosperms), cannabis, cotton, regenerated or spun cellulose, jute, flax, ramie, bagasse, kenaf, or other plant based cellulosic fiber sources. Said microfibrillated cellulose (also commonly referred to as nanocellulose, nanofibrillated cellulose, nanofibers, or microfibers) may be manufactured from any cellulose containing fibers, which may be found in chemical pulp, mechanical pulp, thermomechanical pulp, chemi(thermo) mechanical pulp (CMP or CTMP). The pulp used may include pulp from hardwood, softwood or a combination of both types of wood. The chemical pulps that may be used in accordance with the present invention include all types of chemical wood-based pulps, such as bleached, half-bleached and unbleached sulphite, kraft and soda pulps, and mixtures or combinations of these. The chemical strength agents, additives, and binders can be selected from permanent wet strength binders such as polyamide-polyamine-epichlorohydrin, polyacrylamides, styrenebutadiene latexes; insolubilized polyvinyl alcohol; urea-formaldehyde; polyethyleneimine; chitosan polymers and mixtures thereof. They may also be temporary wet strength binders such as modified starch which can be made by reacting dimethoxyethyl-N-methyl-chloroacetamide with cationic starch polymers or glyoxalated polyacrylamides or mixtures thereof. Dry strength additives may also be used, such as starch (modified or unmodified), polyvinyl alcohol, guar or locust bean gums; and/or carboxymethyl cellulose, anionic or cationic polyacrylamides, ethylene vinyl acetate, alph-opefin polyerms with an ethylene-carboxylic acid copolymer, or size agents such as alkenylsuccinic anhydride or alkyl keton dimmers or rosin dispersion sizing.

The web produced on the wet laid asset is then laminated to produce a two-ply product in a converting operation where the layer of the web containing the cross-linked fiber faces outward.

Another method to apply a mixture of a chemical strength agent and microfibrillated cellulose to a paper web is to deliver the mixture to the web in a contacting step, such as by printing the additives onto the fibrous structures via cylinders or rolls, such as rotogravure rolls, and/or by brushing the additives onto the fibrous structures in the converting process.

Figure 1:
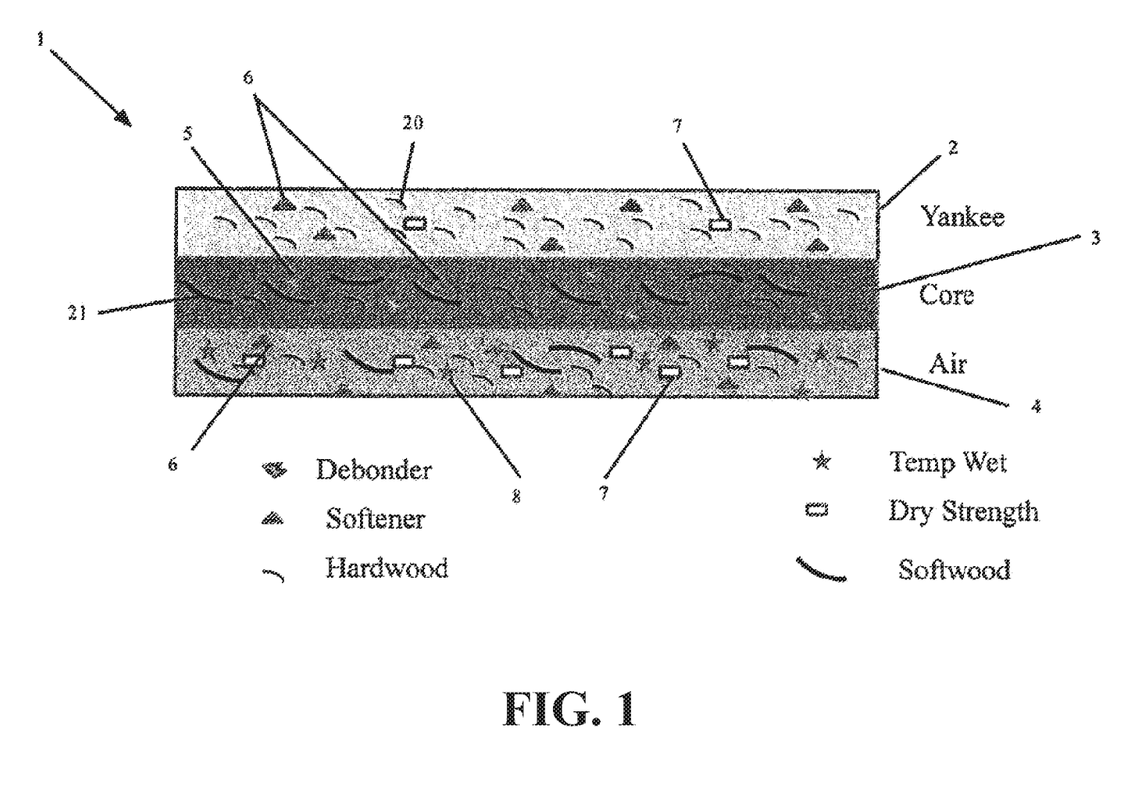
FIG. 1 is a cross-sectional view of a tissue web according to an exemplary embodiment of the present invention.

FIG. 1 shows an example of a single web prior to lamination of a three layer tissue product, generally designated by reference number 1, that has external (exterior) layers 2 and 4 as well as an internal (interior), core layer 3. In the figure, the three layers of the tissue from top to bottom are labeled as air 4, core 3 and dry (or Yankee) 2. External layer 2 is composed primarily of hardwood fibers 20 whereas external layer 4 and core layer 3 are composed of a combination of hardwood fibers 20 and softwood fibers 21. External layer 2 further includes a dry strength additive 7. External layer 4 further includes both a dry strength additive 7 and a temporary wet strength additive 8. In an exemplary embodiment, the cross-linked fibers would be only added to the stock chest which feeds the Yankee layer, which is the side of the web that faces outward or toward the customer after the lamination step of the converting process.

Pulp mixes for exterior layers of the tissue are prepared with a blend of primarily hardwood fibers. For example, the pulp mix for at least one exterior layer is a blend containing about 70 percent or greater hardwood fibers relative to the total percentage of fibers that make up the blend. As a further example, the pulp mix for at least one exterior layer is a blend containing about 90-100 percent hardwood fibers relative to the total percentage of fibers that make up the blend.

Pulp mixes for the interior layer of the tissue are prepared with a blend of primarily softwood fibers. For example, the pulp mix for the interior layer is a blend containing about 70 percent or greater softwood fibers relative to the total percentage of fibers that make up the blend. As a further example, the pulp mix for the interior layer is a blend containing about 90-100 percent softwood fibers relative to the total percentage of fibers that make up the blend.

As known in the art, pulp mixes are subjected to a dilution stage in which water is added to the mixes so as to form a slurry. After the dilution stage but prior to reaching the headbox, each of the pulp mixes are dewatered to obtain a thick stock of about 95% water. In an exemplary embodiment of the invention, wet end additives are introduced into the thick stock pulp mixes of at least the interior layer.

In an exemplary embodiment, a dry strength additive is added to the thick stock mix for at least one of the exterior layers. The dry strength additive may be, for example, amphoteric starch, added in a range of about 1 to 40 kg/ton.

In another exemplary embodiment, a wet strength additive is added to the thick stock mix for at least one of the exterior layers. The wet strength additive may be, for example, glyoxalated polyacrylamide, commonly known as GPAM, added in a range of about 0.25 to 5 kg/ton. In a further exemplary embodiment, both a dry strength additive, preferably amphoteric starch and a wet strength additive, preferably GPAM are added to one of the exterior layers. Without being bound by theory, it is believed that the combination of both amphoteric starch and GPAM in a single layer when added as wet end additives provides a synergistic effect with regard to strength of the finished tissue. Other exemplary temporary wet-strength agents include aldehyde functionalized cationic starch, aldehyde functionalized polyacrylamides, acrolein co-polymers and cis-hydroxyl polysaccharide (guar gum and locust bean gum) used in combination with any of the above mentioned compounds.

In addition to amphoteric starch, suitable dry strength additives may include but are not limited to glyoxalated polyacrylamide, cationic starch, carboxy methyl cellulose, guar gum, locust bean gum, cationic polyacrylamide, polyvinyl alcohol, anionic polyacrylamide or a combination thereof.

Figure 2:
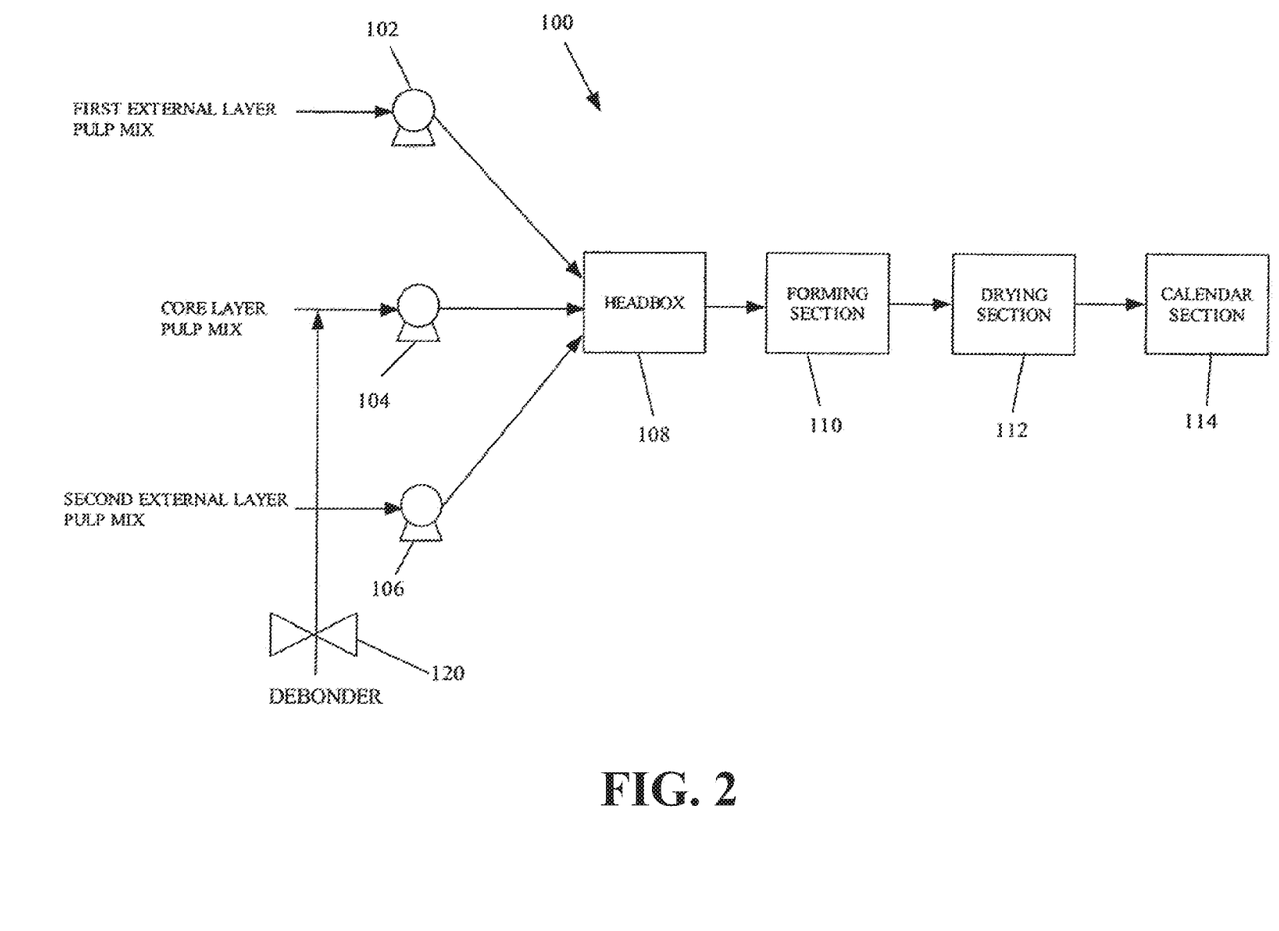
FIG. 2 is a block diagram of a system for manufacturing a three layer tissue according to an exemplary embodiment of the present invention.

FIG. 2 is a block diagram of a system for manufacturing such a three layer tissue, generally designated by reference number 100, according to an exemplary embodiment of the present invention. The system 100 includes a first exterior layer fan pump 102, a core layer fan pump 104, a second exterior layer fan pump 106, a headbox 108, a forming section 110, a drying section 112 and a calender section 114. The first and second exterior layer fan pumps 102, 106 deliver the pulp mixes of the first and second external layers 2, 4 to the headbox 108, and the core layer fan pump 104 delivers the pulp mix of the core layer 3 to the headbox 108. As is known in the art, the headbox delivers a wet web of pulp onto a forming wire within the forming section 110. The wet web is then laid on the forming wire with the core layer 3 disposed between the first and second external layers 2, 4.

After formation in the forming section 110, the partially dewatered web is transferred to the drying section 112. Within the drying section 112, the tissue may be dried using through air drying processes which involve the use of a structured fabric. In an exemplary embodiment, the tissue is dried to a humidity of about 7 to 20% using a through air drier manufactured by Valmet Corporation, of Helsinki, Finland. In another exemplary embodiment, two or more through air drying stages are used in series.

In an exemplary embodiment, the process uses a structuring fabric during the through air drying process to imprint a pattern into the web. Such patterning can be achieved through the use of a TAD fabric, such as a G-weave (Prolux 003) or M-weave (Prolux 005) TAD fabric.

After the through air drying stage, the tissue of the present invention may be further dried in a second phase using a Yankee drying drum. In an exemplary embodiment, a creping adhesive is applied to the drum prior to the tissue contacting the drum. A creping blade is then used to remove the tissue from the Yankee drying drum. The tissue may then be calendered in a subsequent stage within the calender section 114. According to an exemplary embodiment, calendering may be accomplished using a number of calendar rolls (not shown) that deliver a calendering pressure in the range of 0-100 pounds per linear inch (PLI). In general, increased calendering pressure is associated with reduced caliper and a smoother tissue surface.

According to an exemplary embodiment of the invention, a ceramic coated creping blade is used to remove the tissue from the Yankee drying drum. Ceramic coated creping blades result in reduced adhesive build up and aid in achieving higher run speeds. Without being bound by theory, it is believed that the ceramic coating of the creping blades provides a less adhesive surface than metal creping blades and is more resistant to edge wear that can lead to localized spots of adhesive accumulation. The ceramic creping blades allow for a greater amount of creping adhesive to be used which in turn provides improved sheet integrity and faster run speeds.

In addition to the use of wet end additives, the tissue of the present invention may also be treated with topical or surface deposited additives. Examples of surface deposited additives include softeners for increasing fiber softness and skin lotions. Examples of topical softeners include but are not limited to quaternary ammonium compounds, including, but not limited to, the dialkyldimethylammonium salts (e.g. ditallowdimethylammonium chloride, ditallowdimethylammonium methyl sulfate, di(hydrogenated tallow)dimethyl ammonium chloride, etc.). Another class of chemical softening agents include organo-reactive polydimethyl siloxane ingredients, also including amino functional polydimethyl siloxane, zinc stearate, aluminum stearate, sodium stearate, calcium stearate, magnesium stearate, spermaceti, and stearyl oil.

To enhance the strength and absorbency of the structured towel or tissue, multiple plies are laminated together using, for example, a heated adhesive, as described below with respect to FIG. 3. The adhesive mixture is water soluble and includes a mixture of one or more adhesives, one or more water soluble cationic resins and water. The one or more adhesives are present in an amount of 1% to 10% by weight and may be polyvinyl alcohol, polyvinyl acetate, starch based resins and/or mixtures thereof. A water soluble cationic resin may be present in an amount of up to 10% by weight and may include polyamide-epichlorohydrin resins, glyoxalated polyacrylamide resins, polyethyleneimine resins, polyethylenimine resins, and/or mixtures thereof. The remainder of the mixture is composed of water.

Figure 3:
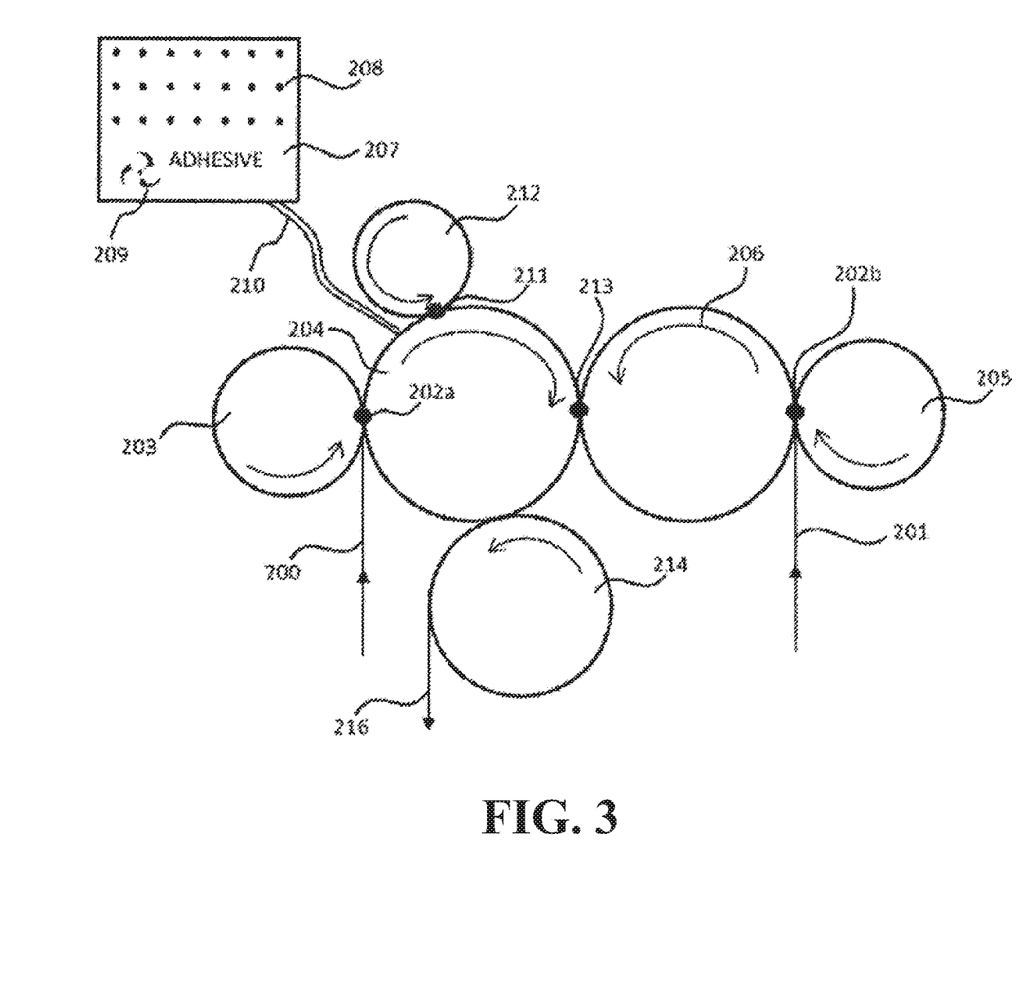
FIG. 3 is a block diagram of an apparatus for manufacturing a laminate of two plies of a structured paper towel or tissue in accordance with an exemplary embodiment of the present invention.

FIG. 3 shows an apparatus for manufacturing a laminate of two plies of a structured paper towel or tissue that are joined to each other, in a face-to-face relationship, in accordance with an exemplary embodiment of the present invention. As shown in the figure, two webs 200, 201 of single ply tissue, which may be manufactured, for example, according to a method described above, are fed to respective pairs of mated pressure rolls 203, 205 and substantially axially parallel embossing rolls 204, 206. A first web 200 is thus fed through a nip 202a formed by pressure roll 203 and embossing roll 204 (also known as a pattern roll) and a second web 201 is likewise fed through a nip 202b between pressure roll 205 and embossing roll 206. The embossing rolls 204, 206, which rotate in the illustrated directions, impress an embossment pattern onto the webs as they pass through nip 202a and 202b. After being embossed, each ply may have a plurality of embossments protruding outwardly from the plane of the ply towards the adjacent ply. The adjacent ply likewise may have opposing protuberances protruding towards the first ply. If a three ply product is produced by adding a third pair of mated pressure and embossing rolls, the central ply may have embossments extending outwardly in both directions.

To perform the embossments at nips 202a and 202b, the embossing rolls 204, 206 have embossing tips or embossing knobs that extend radially outward from the rolls to make the embossments. In the illustrated embodiment, embossing is performed by nested embossing in which the crests of the embossing knobs on one embossing roll intermesh with the embossing knobs on the opposing embossing roll and a nip is formed between the embossing rolls. As the web is fed through nips 202a and 202b, a pattern is produced on the surface of the web by the interconnectivity of the knobs on an embossing roll with the open spaces of the respective pressure roll.

An adhesive applicator roll 212 is positioned upstream of the nip 213 formed between the two embossing rolls and is aligned in an axially parallel arrangement with one of the two embossing rolls to form a nip therewith. The heated adhesive is fed from an adhesive tank 207 via a conduit 210 to applicator roll 212. The applicator roll 212 transfers heated adhesive to an interior side of embossed ply 200 to adhere the at least two plies 200, 201 together, wherein the interior side is the side of ply 200 that comes into a face-to-face relationship with ply 201 for lamination. The adhesive is applied to the ply at the crests of the embossing knobs 205 on embossing roll 204.

Notably, in the present invention, the adhesive is heated and maintained at a desired temperature utilizing, in embodiments, an adhesive tank 207, which is an insulated stainless steel tank that may have heating elements 208 that are substantially uniformly distributed throughout the interior heating surface. In this manner, a large amount of surface area may be heated relatively uniformly. Generally, an adjustable thermostat may be used to control the temperature of the adhesive tank 207. It has been found advantageous to maintain the temperature of the adhesive at between approximately 32 degrees C. (90 degrees F.) to 66 degrees C. (150 degrees F.), and preferably to around 49 degrees C. (120 degrees F.). In addition, in embodiments, the tank has an agitator 209 to ensure proper mixing and heat transfer.

The webs are then fed through the nip 213 where the embossing patterns on each embossing roll 204, 206 mesh with one another.

In nested embossing, the crests of the embossing knobs typically do not touch the perimeter of the opposing roll at the nip formed therebetween. Therefore, after the application of the embossments and the adhesive, a marrying roll 214 is used to apply pressure for lamination. The marrying roll 214 forms a nip with the same embossing roll 204 that forms the nip with the adhesive applicator roll 212, downstream of the nip formed between the two embossing rolls 204, 206. The marrying roll 214 is generally needed because the crests of the nested embossing knobs 205 typically do not touch the perimeter of the opposing roll 206 at the nip 213 formed therebetween.

The following test procedures were used to determine certain properties of the Examples and Comparative Examples discussed herein:

Softness Testing

Softness of a 2-ply tissue web was determined using a Tissue Softness Analyzer (TSA), available from EMTEC Electronic GmbH of Leipzig, Germany. The TSA comprises a rotor with vertical blades which rotate on the test piece to apply a defined contact pressure. Contact between the vertical blades and the test piece creates vibrations which are sensed by a vibration sensor. The sensor then transmits a signal to a PC for processing and display. The frequency analysis in the range of approximately 200 to 1000 Hz represents the surface smoothness or texture of the test piece and is referred to as the TS750 value. A further peak in the frequency range between 6 and 7 kHz represents the bulk softness of the test piece and is referred to as the TS7 value. Both TS7 and TS750 values are expressed as dB V$^2$ rms. The stiffness of the sample is also calculated as the device measures deformation of the sample under a defined load. The stiffness value (D) is expressed as mm/N. The device also calculates a Hand Feel (HF) number with the value corresponding to a softness as perceived when someone touches a tissue sample by hand (the higher the HF number, the higher the softness). The HF number is a combination of the TS750, TS7, and stiffness of the sample measured by the TSA and calculated using an algorithm which also requires the caliper and basis weight of the sample. Different algorithms can be selected for different facial, toilet, and towel paper products. Before testing, a calibration check should be performed using "TSA Leaflet Collection No. 9" available from EMTECH dated 2016 May 10. If the calibration check demonstrates a calibration is necessary, "TSA Leaflet Collection No. 10" is followed for the calibration procedure available from EMTECH dated 2015 Sep. 9.

A punch was used to cut out five 100 cm$^2$ round samples from the web. One of the samples was loaded into the TSA, clamped into place (outward facing or embossed ply facing upward), and the TPII algorithm was selected from the list of available softness testing algorithms displayed by the TSA. After inputting parameters for the sample (including caliper and basis weight), the TSA measurement program was run. The test process was repeated for the remaining samples and the results for all the samples were averaged and the average HF number recorded Ball Burst Testing The Ball Burst of a 2-ply tissue web was determined using a Tissue Softness Analyzer (TSA), available from emtec Electronic GmbH of Leipzig, Germany using a ball burst head and holder. A punch was used to cut out five 100 cm$^2$ round samples from the web. One of the samples was loaded into the TSA, with the embossed surface facing down, over the holder and held into place using the ring. The ball burst algorithm was selected from the list of available softness testing algorithms displayed by the TSA. The ball burst head was then pushed by the TSA through the sample until the web ruptured and calculated the grams force required for the rupture to occur. The test process was repeated for the remaining samples and the results for all the samples were averaged.

Stretch & MD, CD, and Wet CD Tensile Strength Testing

An Instron 3343 tensile tester, manufactured by Instron of Norwood, Mass., with a 100N load cell and 25.4 mm rubber coated jaw faces was used for tensile strength measurement. Prior to measurement, the Instron 3343 tensile tester was calibrated. After calibration, 8 strips of 2-ply product, each 2.54 cm by 10.16 cm (one inch by four inches), were provided as samples for each test. When testing MD (Material Direction) tensile strength, the strips are cut in the MD direction. When testing CD (Cross Direction) tensile strength, the strips are cut in the CD direction. One of the sample strips was placed in between the upper jaw faces and clamp, and then between the lower jaw faces and clamp with a gap of 5.08 cm (2 inches) between the clamps. A test was run on the sample strip to obtain tensile strength and stretch. The test procedure was repeated until all the samples were tested. The values obtained for the eight sample strips were averaged to determine the tensile strength of the tissue. When testing CD wet tensile, the strips are placed in an oven at 105 degrees Celsius for 5 minutes and saturated with 75 microliters of deionized water immediately prior to pulling the sample.

Lint Testing

The amount of lint generated from a tissue product was determined with a Sutherland Rub Tester. This tester uses a motor to rub a weighted felt 5 times over the stationary tissue. The Hunter Color L value is measured before and after the rub test. The difference between these two Hunter Color L values is calculated as lint.

Lint Testing—Sample Preparation:

Prior to the lint rub testing, the paper samples to be tested should be conditioned according to Tappi Method #T402OM-88. Here, samples are preconditioned for 24 hours at a relative humidity level of 10 to 35% and within a temperature range of 22° to 40° C. After this preconditioning step, samples should be conditioned for 24 hours at a relative humidity of 48 to 52% and within a temperature range of 22° to 24° C. This rub testing should also take place within the confines of the constant temperature and humidity room.

The Sutherland Rub Tester may be obtained from Testing Machines, Inc. (Amityville, N.Y. 11701). The tissue is first prepared by removing and discarding any product which might have been abraded in handling, e.g. on the outside of the roll. For multi-ply finished product, three sections with each containing two sheets of multi-ply product are removed and set on the bench-top. For single-ply product, six sections with each containing two sheets of single-ply product are removed and set on the bench-top. Each sample is then folded in half such that the crease is running along the cross direction (CD) of the tissue sample. For the multi-ply product, make sure one of the sides facing out is the same side facing out after the sample is folded. In other words, do not tear the plies apart from one another and rub test the sides facing one another on the inside of the product. For the single-ply product, make up 3 samples with the off-Yankee side out and 3 with the Yankee side out. Keep track of which samples are Yankee side out and which are off-Yankee side out.

Obtain a 30"×40" piece of Crescent #300 cardboard from Cordage Inc. (800 E. Ross Road, Cincinnati, Ohio, 45217). Using a paper cutter, cut out six pieces of cardboard of dimensions of 2.5"×6". Puncture two holes into each of the six cards by forcing the cardboard onto the hold down pins of the Sutherland Rub tester.

If working with single-ply finished product, center and carefully place each of the 2.5"×6" cardboard pieces on top of the six previously folded samples. Make sure the 6" dimension of the cardboard is running parallel to the machine direction (MD) of each of the tissue samples. If working with multi-ply finished product, only three pieces of the 2.5"×6" cardboard will be required. Center and carefully place each of the cardboard pieces on top of the three previously folded samples. Once again, make sure the 6" dimension of the cardboard is running parallel to the machine direction (MD) of each of the tissue samples.

Fold one edge of the exposed portion of tissue sample onto the back of the cardboard. Secure this edge to the cardboard with adhesive tape obtained from 3M Inc. (¾" wide Scotch Brand, St. Paul, Minn.). Carefully grasp the other over-hanging tissue edge and snugly fold it over onto the back of the cardboard. While maintaining a snug fit of the paper onto the board, tape this second edge to the back of the cardboard. Repeat this procedure for each sample.

Turn over each sample and tape the cross direction edge of the tissue paper to the cardboard. One half of the adhesive tape should contact the tissue paper while the other half is adhering to the cardboard. Repeat this procedure for each of the samples. If the tissue sample breaks, tears, or becomes frayed at any time during the course of this sample preparation procedure, discard and make up a new sample with a new tissue sample strip.

If working with multi-ply converted product, there will now be 3 samples on the cardboard. For single-ply finished product, there will now be 3 off-Yankee side out samples on cardboard and 3 Yankee side out samples on cardboard.

Lint Testing—Felt Preparation

Obtain a 30"×40" piece of Crescent #300 cardboard from Cordage Inc. (800 E. Ross Road, Cincinnati, Ohio, 45217). Using a paper cutter, cut out six pieces of cardboard of dimensions of 2.25"×7.25". Draw two lines parallel to the short dimension and down 1.125" from the top and bottom most edges on the white side of the cardboard. Carefully score the length of the line with a razor blade using a straight edge as a guide. Score it to a depth about half way through the thickness of the sheet. This scoring allows the cardboard/felt combination to fit tightly around the weight of the Sutherland Rub tester. Draw an arrow running parallel to the long dimension of the cardboard on this scored side of the cardboard.

Cut the six pieces of black felt (F-55 or equivalent from New England Gasket, 550 Broad Street, Bristol, Conn. 06010) to the dimensions of 2.25"×8.5"×0.0625. Place the felt on top of the unscored, green side of the cardboard such that the long edges of both the felt and cardboard are parallel and in alignment. Make sure the fluffy side of the felt is facing up. Also allow about 0.5" to overhang the top and bottom most edges of the cardboard. Snuggly fold over both overhanging felt edges onto the backside of the cardboard with Scotch brand tape. Prepare a total of six of these felt/cardboard combinations.

For best reproducibility, all samples should be run with the same lot of felt. Obviously, there are occasions where a single lot of felt becomes completely depleted. In those cases where a new lot of felt must be obtained, a correction factor should be determined for the new lot of felt. To determine the correction factor, obtain a representative single tissue sample of interest, and enough felt to make up 24 cardboard/felt samples for the new and old lots.

As described below and before any rubbing has taken place, obtain Hunter L readings for each of the 24 cardboard/felt samples of the new and old lots of felt. Calculate the averages for both the 24 cardboard/felt samples of the old lot and the 24 cardboard/felt samples of the new lot.

Next, rub test the 24 cardboard/felt boards of the new lot and the 24 cardboard/felt boards of the old lot as described below. Make sure the same tissue lot number is used for each of the 24 samples for the old and new lots. In addition, sampling of the paper in the preparation of the cardboard/tissue samples must be done so the new lot of felt and the old lot of felt are exposed to as representative as possible of a tissue sample. For the case of 1-ply tissue product, discard any product which might have been damaged or abraded. Next, obtain 48 strips of tissue each two usable units (also termed sheets) long. Place the first two usable unit strip on the far left of the lab bench and the last of the 48 samples on the far right of the bench. Mark the sample to the far left with the number "1" in a 1 cm by 1 cm area of the corner of the sample. Continue to mark the samples consecutively up to 48 such that the last sample to the far right is numbered 48.

Use the 24 odd numbered samples for the new felt and the 24 even numbered samples for the old felt. Order the odd number samples from lowest to highest. Order the even numbered samples from lowest to highest. Now, mark the lowest number for each set with a letter "Y." Mark the next highest number with the letter "O." Continue marking the samples in this alternating "Y"/"O" pattern. Use the "Y" samples for yankee side out lint analyses and the "O" samples for off-Yankee side lint analyses. For 1-ply product, there are now a total of 24 samples for the new lot of felt and the old lot of felt. Of this 24, twelve are for yankee side out lint analysis and 12 are for off-yankee side lint analysis.

Rub and measure the Hunter Color L values for all 24 samples of the old felt as described below. Record the 12 yankee side Hunter Color L values for the old felt. Average the 12 values. Record the 12 off-yankee side Hunter Color L values for the old felt. Average the 12 values. Subtract the average initial un-rubbed Hunter Color L felt reading from the average Hunter Color L reading for the yankee side rubbed sambles. This is the delta average difference for the Yankee side samples. Subtract the average initial un-rubbed Hunter Color L felt reading from the average Hunter Color L reading for the off-yankee side rubbed sambles. This is the delta average difference for the off-Yankee side samples. Calculate the sum of the delta average difference for the yankee-side and the delta average difference for the off-Yankee side and divide this sum by 2. This is the uncorrected lint value for the old felt. If there is a current felt correction factor for the old felt, add it to the uncorrected lint value for the old felt. This value is the corrected Lint Value for the old felt.

Rub and measure the Hunter Color L values for all 24 samples of the new felt as described below. Record the 12 Yankee side Hunter Color L values for the new felt. Average the 12 values. Record the 12 off-yankee side Hunter Color L values for the new felt. Average the 12 values. Subtract the average initial un-rubbed Hunter Color L felt reading from the average Hunter Color L reading for the Yankee side rubbed sambles. This is the delta average difference for the Yankee side samples. Subtract the average initial un-rubbed Hunter Color L felt reading from the average Hunter Color L reading for the off-Yankee side rubbed samples. This is the delta average difference for the off-yankee side samples. Calculate the sum of the delta average difference for the Yankee-side and the delta average difference for the off-Yankee side and divide this sum by 2. This is the uncorrected lint value for the new felt.

Take the difference between the corrected Lint Value from the old felt and the uncorrected lint value for the new felt. This difference is the felt correction factor for the new lot of felt.

Adding this felt correction factor to the uncorrected lint value for the new felt should be identical to the corrected Lint Value for the old felt.

The same type procedure is applied to two-ply tissue product with 24 samples run for the old felt and 24 run for the new felt. But, only the consumer used outside layers of the plies are rub tested. As noted above, make sure the samples are prepared such that a representative sample is obtained for the old and new felts.

Lint Testing—Care of 4 Pound Weight

The four pound weight has four square inches of effective contact area providing a contact pressure of one pound per square inch. Since the contact pressure can be changed by alteration of the rubber pads mounted on the face of the weight, it is important to use only the rubber pads supplied by the manufacturer (Brown Inc., Mechanical Services Department, Kalamazoo, Mich.). These pads must be replaced if they become hard, abraded or chipped off.

When not in use, the weight must be positioned such that the pads are not supporting the full weight of the weight. It is best to store the weight on its side.

Lint Testing—Rub Tester Instrument Calibration

The Sutherland Rub Tester must first be calibrated prior to use. First, turn on the Sutherland Rub Tester by moving the tester switch to the "cont" position. When the tester arm is in its position closest to the user, turn the tester's switch to the "auto" position. Set the tester to run 5 strokes by moving the pointer arm on the large dial to the "five" position setting. One stroke is a single and complete forward and reverse motion of the weight. The end of the rubbing block should be in the position closest to the operator at the beginning and at the end of each test.

Prepare a tissue paper on cardboard sample as described above. In addition, prepare a felt on cardboard sample as described above. Both of these samples will be used for calibration of the instrument and will not be used in the acquisition of data for the actual samples.

Place this calibration tissue sample on the base plate of the tester by slipping the holes in the board over the hold-down pins. The hold-down pins prevent the sample from moving during the test. Clip the calibration felt/cardboard sample onto the four pound weight with the cardboard side contacting the pads of the weight. Make sure the cardboard/felt combination is resting flat against the weight. Hook this weight onto the tester arm and gently place the tissue sample underneath the weight/felt combination. The end of the weight closest to the operator must be over the cardboard of the tissue sample and not the tissue sample itself. The felt must rest flat on the tissue sample and must be in 100% contact with the tissue surface. Activate the tester by depressing the "push" button.

Keep a count of the number of strokes and observe and make a mental note of the starting and stopping position of the felt covered weight in relationship to the sample. If the total number of strokes is five and if the end of the felt covered weight closest to the operator is over the cardboard of the tissue sample at the beginning and end of this test, the tester is calibrated and ready to use. If the total number of strokes is not five or if the end of the felt covered weight closest to the operator is over the actual paper tissue sample either at the beginning or end of the test, repeat this calibration procedure until 5 strokes are counted the end of the felt covered weight closest to the operator is situated over the cardboard at the both the start and end of the test.

During the actual testing of samples, monitor and observe the stroke count and the starting and stopping point of the felt covered weight. Recalibrate when necessary.

Lint Testing—Hunter Color Meter Calibration

Adjust the Hunter Color Difference Meter for the black and white standard plates according to the procedures outlined in the operation manual of the instrument. Also run the stability check for standardization as well as the daily color stability check if this has not been done during the past eight hours. In addition, the zero reflectance must be checked and readjusted if necessary.

Place the white standard plate on the sample stage under the instrument port. Release the sample stage and allow the sample plate to be raised beneath the sample port.

Using the "L-Y", "a-X", and "b-Z" standardizing knobs, adjust the instrument to read the Standard White Plate Values of "L", "a", and "b" when the "L", "a", and "b" push buttons are depressed in turn.

Lint Testing—Measurement of Samples

The first step in the measurement of lint is to measure the Hunter color values of the black felt/cardboard samples prior to being rubbed on the tissue. The first step in this measurement is to lower the standard white plate from under the instrument port of the Hunter color instrument. Center a felt covered cardboard, with the arrow pointing to the back of the color meter, on top of the standard plate. Release the sample stage, allowing the felt covered cardboard to be raised under the sample port.

Since the felt width is only slightly larger than the viewing area diameter, make sure the felt completely covers the viewing area. After confirming complete coverage, depress the L push button and wait for the reading to stabilize. Read and record this L value to the nearest 0.1 unit.

If a D25D2A head is in use, lower the felt covered cardboard and plate, rotate the felt covered cardboard 90 degrees so the arrow points to the right side of the meter. Next, release the sample stage and check once more to make sure the viewing area is completely covered with felt. Depress the L push button. Read and record this value to the nearest 0.1 unit. For the D25D2M unit, the recorded value is the Hunter Color L value. For the D25D2A head where a rotated sample reading is also recorded, the Hunter Color L value is the average of the two recorded values.

Measure the Hunter Color L values for all of the felt covered cardboards using this technique. If the Hunter Color L values are all within 0.3 units of one another, take the average to obtain the initial L reading. If the Hunter Color L values are not within the 0.3 units, discard those felt/cardboard combinations outside the limit. Prepare new samples and repeat the Hunter Color L measurement until all samples are within 0.3 units of one another.

For the measurement of the actual tissue paper/cardboard combinations, place the tissue sample/cardboard combination on the base plate of the tester by slipping the holes in the board over the hold-down pins. The hold-down pins prevent the sample from moving during the test. Clip the calibration felt/cardboard sample onto the four pound weight with the cardboard side contacting the pads of the weight. Make sure the cardboard/felt combination is resting flat against the weight. Hook this weight onto the tester arm and gently place the tissue sample underneath the weight/felt combination. The end of the weight closest to the operator must be over the cardboard of the tissue sample and not the tissue sample itself. The felt must rest flat on the tissue sample and must be in 100% contact with the tissue surface.

Next, activate the tester by depressing the "push" button. At the end of the five strokes the tester will automatically stop. Note the stopping position of the felt covered weight in relation to the sample. If the end of the felt covered weight toward the operator is over cardboard, the tester is operating properly. If the end of the felt covered weight toward the operator is over sample, disregard this measurement and recalibrate as directed above in the Sutherland Rub Tester Calibration section.

Remove the weight with the felt covered cardboard. Inspect the tissue sample. If torn, discard the felt and tissue and start over. If the tissue sample is intact, remove the felt covered cardboard from the weight. Determine the Hunter Color L value on the felt covered cardboard as described above for the blank felts. Record the Hunter Color L readings for the felt after rubbing. Rub, measure, and record the Hunter Color L values for all remaining samples.

After all tissues have been measured, remove and discard all felt. Felts strips are not used again. Cardboards are used until they are bent, torn, limp, or no longer have a smooth surface.

Lint Testing—Calculations

Determine the delta L values by subtracting the average initial L reading found for the unused felts from each of the measured values for the off-Yankee and Yankee sides of the sample. Recall, multi-ply-ply product will only rub one side of the paper. Thus, three delta L values will be obtained for the multi-ply product. Average the three delta L values and subtract the felt factor from this final average. This final result is termed the lint for the fabric side of the 2-ply product.

For the single-ply product where both Yankee side and off-Yankee side measurements are obtained, subtract the average initial L reading found for the unused felts from each of the three Yankee side L readings and each of the three off-Yankee side L readings. Calculate the average delta for the three Yankee side values. Calculate the average delta for the three fabric side values. Subtract the felt factor from each of these averages. The final results are termed a lint for the fabric side and a lint for the Yankee side of the single-ply product. By taking the average of these two values, an ultimate lint value is obtained for the entire single-ply product.

Basis Weight

Using a dye and press, six 76.2 mm by 76.2 mm square samples were cut from a 2-ply product being careful to avoid any web perforations. The samples were placed in an oven at 105 deg C. for 5 minutes before being weighed on an analytical balance to the fourth decimal point. The weight of the sample in grams was divided by $(0.0762 m)^2$ to determine the basis weight in grams/m$^2$.

Caliper Testing

A Thwing-Albert ProGage 100 Thickness Tester, manufactured by Thwing Albert of West Berlin, N.J. was used for the caliper test. Eight 100 mm×100 mm square samples were cut from a 2-ply product. The samples were then tested individually and the results were averaged to obtain a caliper result for the base sheet.

The following Comparative Examples and Examples illustrate advantages of exemplary embodiments of the present invention.

Comparative Example: Tissue Product and Process without Use of Crosslinked Pulp

A rolled 2-ply sanitary tissue product with 127 sheets, a roll diameter of 112 mm, with sheets having a length of 4.0 inches and width of 4.0 inches, was produced by laminating two webs of through air dried tissue. The 2-ply tissue product further had the following product attributes: Basis Weight 39.6 g/m$^2$, Caliper 0.614 mm, MD tensile strength of 99.82 N/m, CD tensile strength of 56.17 N/m, a ball burst of 169 grams force, a multi-ply converted product Yankee side lint value of 3.39, an MD stretch of 20.67%, a CD stretch of 8.69%, and a 90.18 HF.

The tissue web was multilayered with the fiber and chemistry of each layer selected and prepared individually to maximize product quality attributes of softness and strength. The first exterior layer, which was the layer that contacted the Yankee dryer, was prepared using 80% eucalyptus and 20% northern bleached softwood kraft fibers with 1.25 kg/ton of the amphoteric starch Redibond 2038 (Corn Products, 10 Finderne Avenue, Bridgewater, N.J. 08807) (for lint control) and 0.4 kg/ton of the glyoxylated polyacrylamide Hercobond 1194 (Solenis, 500 Hercules Road, Wilmington Del., 19808) (for strength when wet and lint control). The interior layer was composed of 20% northern bleached softwood kraft fibers, 80% eucalyptus fibers, 1.0 kg/ton of T526 a softener/debonder (EKA Chemicals Inc., 1775 West Oak Commons Court, Marietta, Ga., 30062) and 0.4 kg/ton of Hercobond 1194. The second exterior layer was composed of 20% northern bleached softwood kraft fibers, 80% eucalyptus fibers and 3.75 kg/ton of Redibond 2038 (to limit refining and impart Z-direction strength). Softwood was refined at 50 kwh/ton to impart the necessary tensile strength. Additionally, each layer utilized 0.25 kg/ton of Hercobond 6950, a polyvinyl amine for colloidal system charge balance.

The fiber and chemicals mixtures were diluted to a solids of 0.5% consistency and fed to separate fan pumps which delivered the slurry to a triple-layered headbox. The headbox pH was controlled to 7.0 by addition of a caustic to the thick stock before the fan pumps. The headbox deposited the slurry to a nip formed by a forming roll, an outer forming wire, and inner forming wire. The slurry was drained through the outer wire, which was a KT194-P design supplied by Asten Johnson (4399 Corporate Rd, Charleston, S.C. (843) 747-7800)), to aid with drainage, fiber support, and web formation. When the fabrics separated, the web followed the inner forming wire and was dried to approximately 25% solids using a series of vacuum boxes and a steam box.

The web was then transferred to a structured fabric with the aid of a vacuum box to facilitate fiber penetration into the structured fabric to enhance bulk softness and web imprinting. The structured fabric was a Prolux 005 design supplied by Albany (216 Airport Drive Rochester, N.H. 03867 USA Tel: +1.603.330.5850) and had a 5 shed design with a warp pick sequence of 1, 3, 5, 2, 4, a 17.8 by 11.1 yarn/cm Mesh and Count, a 0.35 mm warp monofilament, a 0.50 mm weft monofilament, a 1.02 mm caliper, with a 640 cfm and a knuckle surface that was sanded to impart 27% contact area with the Yankee dryer. The web was dried with the aid of two TAD hot air impingement drums to 85% moisture before transfer to the Yankee dryer.

The web was held in intimate contact with the Yankee surface using an adhesive coating chemistry. The Yankee provided steam at 3.0 bar while the installed hot air impingement hood over the Yankee was blowing heated air up to 450 deg C. The web was creped from the Yankee at 13% crepe (speed differential between the Yankee dryer and reel drum) using a ceramic blade at a pocket angle of 90 degrees. The web was cut into two of equal width using a high pressure water stream at 10,000 psi and reeled into two equally sized parent rolls and transported to the converting process.

In the converting process, the two webs were plied together using mechanical ply bonding, or light embossing of the DEKO configuration (only the top sheet is embossed with glue applied to the inside of the top sheet at the high points derived from the embossments using an adhesive supplied by a cliché roll) with the second exterior layer of each web facing each other. The % coverage of the embossment on the top sheet was 4%. The product was wound into a 127 sheet count product at 112 mm diameter.

Example 1: Tissue Product and Process Using Crosslinked Pulp

A rolled 2-ply sanitary tissue product with 127 sheets, a roll diameter of 112 mm, with sheets having a length of 4.0 inches and width of 4.0 inches, was produced by laminating two webs of through air dried tissue. The 2-ply tissue product further had the following product attributes: Basis Weight 39.4 g/m$^2$, Caliper 0.555 mm, MD tensile of 148.82 N/m, CD tensile of 90.41 N/m, a ball burst of 264 grams force, a multi-ply converted product Yankee side lint value of 1.89, an MD stretch of 20.64, a CD stretch of 10.73, and a 80.78 HF.

The tissue web was multilayered with the fiber and chemistry of each layer selected and prepared individually to maximize product quality attributes of softness and strength. The eucalyptus pulp used in the product was crosslinked by the following process: 1.5 tons of eucalyptus fiber at 4% consistency and 80 degrees Celsius was mixed with 121 neat kg of Redibond 2038 (Corn Products, 10 Finderne Avenue, Bridgewater, N.J. 08807) for 20 minutes. Then 112.5 neat grams of a cross-linker was added and mixed for 20 additional minutes. The cross-linker used was Curesan 400, a glyoxyl based product sold by BASF, 100 Park Ave, Florham Park, N.J. 07932. Each of the tissue layers contained 80% crosslinked eucalyptus fiber and 20% northern bleached softwood kraft pulp. The first exterior layer, which was the layer that contacted the Yankee dryer, also contained 1.25 kg/ton of the amphoteric starch Redibond 2038 (for lint control) and 0.4 kg/ton of the glyoxylated polyacrylamide Hercobond 1194 (Solenis, 500 Hercules Road, Wilmington Del., 19808) (for strength when wet and lint control). The interior layer was composed of 20% northern bleached softwood kraft fibers, 80% eucalyptus fibers, 1.0 kg/ton of T526—a softener/debonder (EKA Chemicals Inc., 1775 West Oak Commons Court, Marietta, Ga., 30062), and 0.4 kg/ton of Hercobond 1194. The second exterior layer is composed of 20% northern bleached softwood kraft fibers, 80% eucalyptus fibers and 3.75 kg/ton of Redibond 2038 (to limit refining and impart Z-direction strength). Softwood was refined at 50 kwh/ton to impart the necessary tensile strength. Additionally, each layer utilized 0.25 kg/ton of Hercobond 6950—a polyvinyl amine for colloidal system charge balance.

The fiber and chemicals mixtures were diluted to a solids of 0.5% consistency and fed to separate fan pumps which delivered the slurry to a triple-layered headbox. The headbox pH was controlled to 7.0 by addition of a caustic to the thick stock before the fan pumps. The headbox deposited the slurry to a nip formed by a forming roll, an outer forming wire, and inner forming wire. The slurry was drained through the outer wire, which was a KT194-P design supplied by Asten Johnson (4399 Corporate Rd, Charleston, S.C. (843) 747-7800)), to aid with drainage, fiber support, and web formation. When the fabrics separated, the web followed the inner forming wire and was dried to approximately 25% solids using a series of vacuum boxes and a steam box.

The web was then transferred to a structured fabric with the aid of a vacuum box to facilitate fiber penetration into the structured fabric to enhance bulk softness and web imprinting. The structured fabric was a Prolux 005 design supplied by Albany (216 Airport Drive Rochester, N.H. 03867 USA Tel: +1.603.330.5850) and had a 5 shed design with a warp pick sequence of 1, 3, 5, 2, 4, a 17.8 by 11.1 yarn/cm Mesh and Count, a 0.35 mm warp monofilament, a 0.50 mm weft monofilament, a 1.02 mm caliper, with a 640 cfm and a knuckle surface that was sanded to impart 27% contact area with the Yankee dryer. The web was dried with the aid of two TAD hot air impingement drums to 85% moisture before transfer to the Yankee dryer.

The web was held in intimate contact with the Yankee surface using an adhesive coating chemistry. The Yankee was provided steam at 3.0 bar while the installed hot air impingement hood over the Yankee was blowing heated air up to 450 deg C. The web was creped from the Yankee at 13% crepe (speed differential between the Yankee dryer and reel drum) using a ceramic blade at a pocket angle of 90 degrees. The web was cut into two of equal width using a high pressure water stream at 10,000 psi and reeled into two equally sized parent rolls and transported to the converting process.

In the converting process, the two webs were plied together using mechanical ply bonding, or light embossing of the DEKO configuration (only the top sheet is embossed with glue applied to the inside of the top sheet at the high points derived from the embossments using and adhesive supplied by a cliché roll) with the second exterior layer of each web facing each other. The % coverage of the embossment on the top sheet was 4%. The product was wound into a 127 sheet count product at 112 mm diameter.

Example 2: Tissue Product and Process Using Pulp Crosslinked with Microfibrillated Cellulose A rolled 2-ply sanitary tissue product with 127 sheets, a roll diameter of 112 mm, with sheets a length of 4.0 inches and width of 4.0 inches, was produced by laminating two webs of through air dried tissue. The 2-ply tissue product further had the following product attributes: Basis Weight 41.6 $g/m^2$, Caliper 0.587 mm, MD tensile strength of 156.23 N/m, CD tensile strength of 98.99 N/m, a ball burst of 230 grams force, a multi-ply converted product Yankee side lint value of 1.68, an MD stretch of 22.15, a CD stretch of 8.91, and a 83.88 HF.

The tissue web was multilayered with the fiber and chemistry of each layer selected and prepared individually to maximize product quality attributes of softness and strength. The eucalyptus pulp used in the product was crosslinked by the following process: 1.5 tons of eucalyptus fiber at 4% consistency and 80 degrees Celsius was mixed for 20 minutes with 670 neat kg of microfibrillated cellulose supplied by University of Maine Orono at 2.8% consistency. Next, 121 neat kg of Redibond 2038 (Corn Products, 10 Finderne Avenue, Bridgewater, N.J. 08807) was added and mixed for 20 minutes. Next, 112.5 neat grams of a cross-linker was added and mixed for 20 additional minutes. The cross-linker used was Curesan 400, a glyoxyl based product sold by BASF, 100 Park Ave, Florham Park, N.J. 07932. Each of the tissue layers contained 80% crosslinked eucalyptus fiber and 20% northern bleached softwood kraft pulp. The first exterior layer, which was the layer that contacted the Yankee dryer, also contained 1.25 kg/ton of the amphoteric starch Redibond 2038 (for lint control) and 0.4 kg/ton of the glyoxylated polyacrylamide Hercobond 1194 (Solenis, 500 Hercules Road, Wilmington Del., 19808) (for strength when wet and lint control). The interior layer was composed of 20% northern bleached softwood kraft fibers, 80% eucalyptus fibers, and 1.0 kg/ton of T526—a softener/debonder (EKA Chemicals Inc., 1775 West Oak Commons Court, Marietta, Ga., 30062), and 0.4 kg/ton of Hercobond 1194. The second exterior layer was composed of 20% northern bleached softwood kraft fibers, 80% eucalyptus fibers and 3.75 kg/ton of Redibond 2038 (to limit refining and impart Z-direction strength). Softwood was refined at 50 kwh/ton to impart the necessary tensile strength. Additionally, each layer utilized 0.25 kg/ton of Hercobond 6950—a polyvinyl amine for colloidal system charge balance.

The fiber and chemicals mixtures were diluted to a solids of 0.5% consistency and fed to separate fan pumps which delivered the slurry to a triple layered headbox. The headbox pH was controlled to 7.0 by addition of a caustic to the thick stock before the fan pumps. The headbox deposited the slurry to a nip formed by a forming roll, an outer forming wire, and an inner forming wire. The slurry was drained through the outer wire, which was a KT194-P design supplied by Asten Johnson (4399 Corporate Rd, Charleston, S.C. (843) 747-7800)), to aid with drainage, fiber support, and web formation. When the fabrics separated, the web followed the inner forming wire and was dried to approximately 25% solids using a series of vacuum boxes and a steam box.

The web was then transferred to a structured fabric with the aid of a vacuum box to facilitate fiber penetration into the structured fabric to enhance bulk softness and web imprinting. The structured fabric was a Prolux 005 design supplied by Albany (216 Airport Drive Rochester, N.H. 03867 USA Tel: +1.603.330.5850) and had 5 shed design with a warp pick sequence of 1, 3, 5, 2, 4, a 17.8 by 11.1 yarn/cm Mesh and Count, a 0.35 mm warp monofilament, a 0.50 mm weft monofilament, a 1.02 mm caliper, with a 640 cfm and a knuckle surface that was sanded to impart 27% contact area with the Yankee dryer. The web was dried with the aid of two TAD hot air impingement drums to 85% moisture before transfer to the Yankee dryer.

The web was held in intimate contact with the Yankee surface using an adhesive coating chemistry. The Yankee was provided steam at 3.0 bar while the installed hot air impingement hood over the Yankee was blowing heated air up to 450 deg C. The web was creped from the Yankee at 13% crepe (speed differential between the Yankee dryer and reel drum) using a ceramic blade at a pocket angle of 90 degrees. The web was cut into two of equal width using a high pressure water stream at 10,000 psi and reeled into two equally sized parent rolls and transported to the converting process.

In the converting process, the two webs were plied together using mechanical ply bonding, or light embossing of the DEKO configuration (only the top sheet is embossed with glue applied to the inside of the top sheet at the high points derived from the embossments using and adhesive supplied by a cliché roll) with the second exterior layer of each web facing each other. The % coverage of the embossment on the top sheet was 4%. The product was wound into a 127 sheet count product at 112 mm diameter.

Table 1 provides the product attribute data for each of the Comparative Example and Examples 1 and 2.

TABLE 1

| EXAMPLE | BASIS WEIGHT (gsm) | CALIPER (mm) | MD Tensile Strength (N/m) | CD Tensile Strength (N/m) | Ball Burst (grams force) | Lint Value | MD Stretch (%) | CD Stretch (%) | Softness (HF) |
|---|---|---|---|---|---|---|---|---|---|
| COMP. EX. | 39.6 | 0.614 | 99.82 | 56.17 | 169 | 3.39 | 20.67 | 8.69 | 90.18 |
| EX. 1 | 39.4 | 0.555 | 148.82 | 90.41 | 264 | 1.89 | 20.64 | 10.73 | 80.78 |
| EX. 2 | 41.6 | 0.587 | 156.23 | 98.99 | 230 | 1.68 | 22.15 | 8.91 | 83.88 |

The only difference between the three processes described above in regards to the Comparative Example and Examples 1 and 2 is associated with the way in which the eucalyptus pulp was prepared. All other parameters of the process were held steady.

As shown in Table 1, the process of crosslinking the eucalyptus in Example 1 created a large improvement in the strength of the product as demonstrated by a 49% increase in MD tensile strength, a 61% increase in CD tensile strength, and a 56% improvement in ball burst as compared to the Comparative Example. Additionally, the lint value was decreased by 44%, demonstrating a large reduction in linting, with a 10% reduction in HF softness.

As also shown in Table 2, the process of crosslinking the eucalyptus in Example 2 created a large improvement in the strength of the product as demonstrated by a 57% increase in MD tensile strength, a 76% increase in CD tensile strength, and a 36% improvement in ball burst as compared to the Comparative Example. Additionally, the lint value was decreased by 50%, demonstrating a large reduction in linting, with a 7% reduction in HF softness.

Now that the preferred embodiments of the present invention have been shown and described in detail, various modifications and improvements thereon will become readily apparent to those skilled in the art. Accordingly, the spirit and scope of the present invention is to be construed broadly and not limited by the foregoing specification.

The invention claimed is:

1. A method of making a tissue or paper towel product comprising:
    forming two or more multi-layered webs of cellulosic fibers by a papermaking process using a structured fabric, the papermaking process comprising a step of adding a cross-linker and micro-fibrillated cellulose to a pulp slurry comprising the cellulosic fibers so that at least some of the cellulosic fibers are cross-linked with one another and with the micro-fibrillated cellulose by the cross-linker within the pulp slurry; and
    laminating the two or more multi-layered webs together so as to form a multi-ply product, each ply of the multi-ply product comprising cross-linked fibers as a percentage of the total fiber mix of the ply,
    wherein the micro-fibrillated cellulose is added at an inclusion rate of 0.5 to 2 wt % based on oven dry weight of a total amount of pulp fiber in the tissue or paper towel product.

2. The method of claim 1, wherein the pulp slurry further comprises water and a binder.

3. The method of claim 2, wherein consistency of the pulp slurry is between 2% to 6%.

4. The method of claim 2, wherein consistency of the pulp slurry is between 3% to 5%.

5. The method of claim 2, wherein the cross-linker is a glyoxal-containing cross-linker.

6. The method of claim 2, wherein the binder is a cationic starch containing 0.2% to 0.6% nitrogen by weight.

7. The method of claim 2, wherein the pulp slurry is mixed in a vessel with agitation from 5 to 45 minutes between 150 to 200 degrees Fahrenheit to produce the cross-linked fibers.

8. The method of claim 2, wherein the pulp slurry is mixed in a vessel with agitation from 5 to 30 minutes between 165 and 180 degrees Fahrenheit to produce the cross-linked fibers.

9. The method of claim 2, wherein the cross-linked fibers are blended in different ratios into stock chests that supply different layers of a multi-layered stock preparation system comprising a multi-layered headbox.

10. The method of claim 2, wherein the cross-linked fibers are blended only into stock chests which feed a layer configured to face outward when the webs of the tissue or towel product are laminated together.

11. The method of claim 2, wherein the cross-linked fibers are blended only into stock chests which feed a layer configured to face outward when the webs of the tissue or towel product are laminated together, and the cross-linked fibers make up less than 50% of the total weight percentage of that layer.

12. The method of claim 1, wherein the tissue or paper towel product is made using a process selected from the group consisting of: Through Air Drying (TAD), Uncreped Through Air Drying (UCTAD), Advanced Tissue Molding System (ATMOS), New Tissue Technology (NTT) and Energy Efficient Technologically Advanced Drying (ETAD).

13. The method of claim 1, wherein consistency of the pulp is between 2% to 6%.

14. The method of claim 1, wherein consistency of the pulp is between 3% to 5%.

15. The method of claim 1, wherein the micro-fibrillated cellulose is added at a consistency of 0% to 3%.

16. The method of claim 1, wherein the micro-fibrillated cellulose is added at a consistency of 1%.

17. The method of claim 1, wherein the cross linker that cross-links the at least some of the cellulosic fibers with the micro-fibrillated cellulose is a glyoxal-containing cross-linker added in an amount of 0.05 wt % to 0.25 wt % based on the oven dry weight of the pulp fiber.

18. The method of claim 1, wherein the pulp slurry further comprises a binder and the binder is a cationic starch containing 0.2 wt % to 0.6 wt % nitrogen, added between 25 to 200 dry lbs per metric ton of oven dry weight of the pulp fiber.

19. The method of claim 1, wherein the pulp slurry is mixed in a vessel with agitation from 5 to 45 minutes between 150 to 200 degrees Fahrenheit to produce the cellulose fibers cross-linked with one another and with the microfibrillated cellulose.

20. The method of claim 1, wherein the pulp slurry is mixed in a vessel with agitation from 5 to 30 minutes between 165 and 180 degrees Fahrenheit to produce the cellulose fibers cross-linked with one another and with the microfibrillated cellulose.

21. The method of claim 1, wherein the cellulose fibers cross-linked with one another and with the micro-fibrillated cellulose are blended in different ratios into stock chests that supply different layers of a multilayered stock preparation system.

22. The method of claim 1, wherein the cellulose fibers cross-linked with one another and with the micro-fibrillated cellulose are blended only into stock chests which feed a layer configured to face outward when the webs of the tissue or towel product are laminated together.

23. The method of claim 1, wherein the cellulose fibers cross-linked with one another and with the micro-fibrillated cellulose are blended only into stock chests which feed a layer configured to face outward when the webs of the tissue or towel product are laminated together and the cross-linked fiber is less than 50 wt % of the total weight percentage of that layer.

24. The method of claim 1, further comprising the step of mixing the micro-fibrillated cellulose with a chemical strength agent before adding the micro-fibrillated cellulose to the pulp slurry.

25. The method of claim 24, wherein the chemical strength agent and micro-fibrillated cellulose are mixed and diluted to a total solids content between 0.5% to 3.0% with continuous agitation.

26. The method of claim 24, wherein the chemical strength agent mixed with micro-fibrillated cellulose is added such that the mixture is between 0.5 wt % to 10 wt % total of the bone dry web.

27. The method of claim 24, wherein the chemical strength agent mixed with micro-fibrillated cellulose is added to a stock system such that all layers of a multi-layer headbox are infused with the mixture.

28. The method of claim 24, wherein the chemical strength agent mixed with micro-fibrillated cellulose is added only into stock chests which feed the layer of a multilayered headbox configured to face outward when the webs of the tissue or towel product are laminated together.

* * * * *